United States Patent
Fazzari

[11] 4,043,645
[45] Aug. 23, 1977

[54] FILTER DEVICE WITH ADJUSTABLE SUPERIMPOSED FILTERS

[76] Inventor: Louis A. Fazzari, 6425 Durand Ave., Racine, Wis. 53406

[21] Appl. No.: 603,105

[22] Filed: Aug. 8, 1975

[51] Int. Cl.² ............................................. G02B 5/22
[52] U.S. Cl. .................................. 350/315; 350/316; 350/318
[58] Field of Search ............... 350/316, 315, 314, 318, 350/317, 311, 313; 356/184, 186, 188; 351/45, 26; 355/32, 35, 71; 353/84, 97; 352/213

[56] References Cited

U.S. PATENT DOCUMENTS

| 562,642 | 6/1896 | McDonough | 350/316 |
| 2,009,145 | 7/1935 | Nathan | 350/315 |
| 2,059,361 | 11/1936 | Kenworthy | 350/315 |
| 2,991,692 | 7/1961 | Korf | 350/315 |
| 3,028,483 | 4/1962 | Simmon | 350/318 |
| 3,077,140 | 2/1963 | Simmon et al. | 350/315 |
| 3,883,243 | 5/1975 | Weisglass et al. | 350/315 |

*Primary Examiner*—John K. Corbin
*Assistant Examiner*—Jon W. Henry
*Attorney, Agent, or Firm*—Wegner, Stellman, McCord, Wiles & Wood

[57] ABSTRACT

A device adapted to be associated with a color picture projector for either still or motion pictures for correcting color deficiencies in the projected light beam in which the beam is noticably dominant in a color such as red as in a transparency that has "gone red", the device comprising a plurality of light transparent filters each of a color complementary to the dominant color and means for mounting these filters in superimposed relationship for arcuate movement from and to light intercepting position with varying degrees of overlap to provide varying amounts of the filtering depending upon the intensity of the color that is being corrected.

1 Claim, 4 Drawing Figures

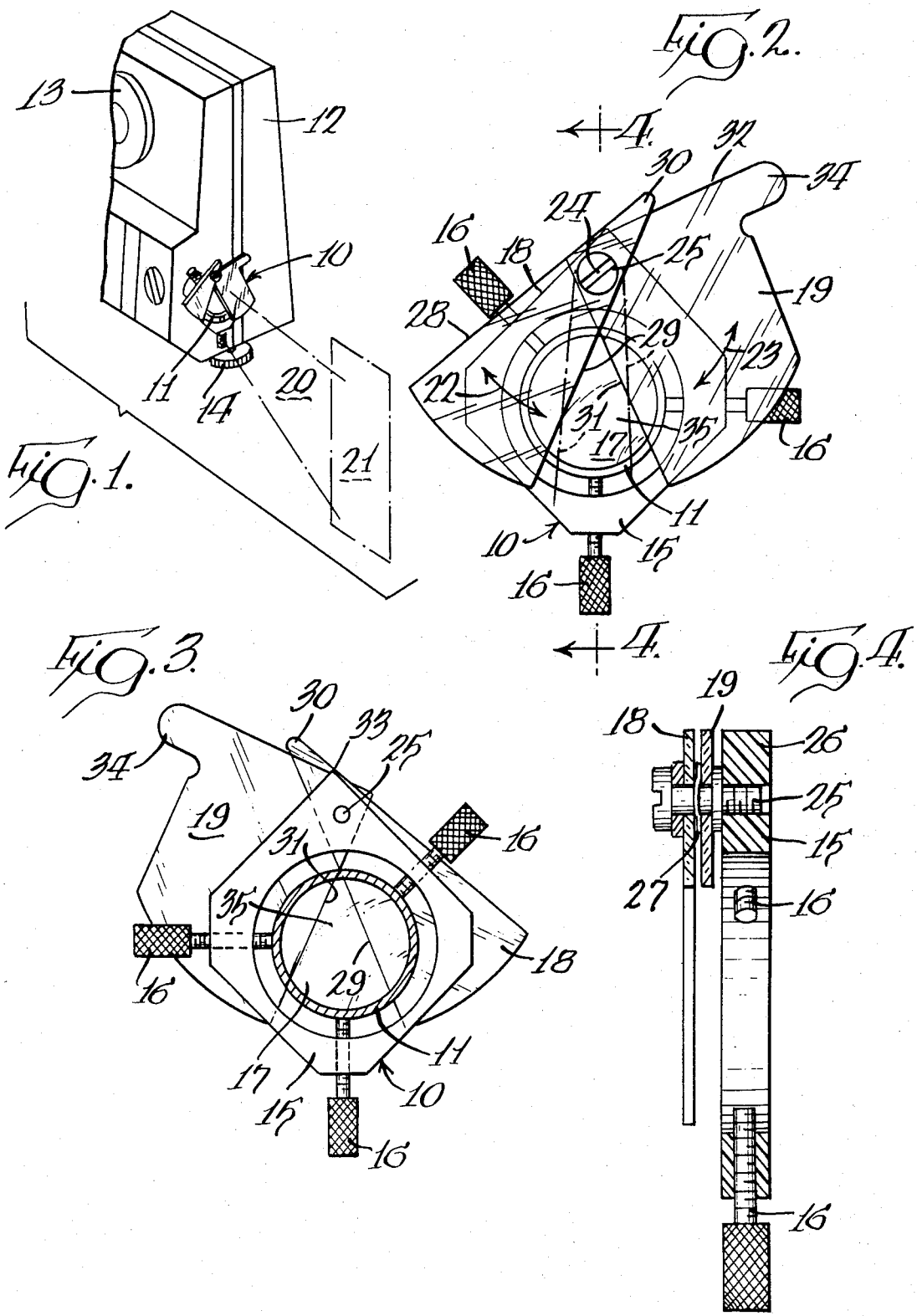

FILTER DEVICE WITH ADJUSTABLE SUPERIMPOSED FILTERS

BACKGROUND OF THE INVENTION

In certain types of picture film, either for still pictures or movie pictures, it frequently occurs that the film will be overly dominant in one color such as excessively red as can be found in many 16mm colored motion picture prints, for example. By the use of this variable filter device the proper amount of compensation can be introduced at the projector for correcting this condition. As in the case of excessive red in the film the degree of dominant coloration sometimes changes from time to time such as with increased red development over a period of time. Thus the filter requirements are sometimes constantly changing so that the degree of compensation must be similarly changed. The device of this invention provides a simple, inexpensive and infinitely variable means of providing the proper amount of correction.

BRIEF DESCRIPTION OF THE DRAWINGS

FIG. 1 is a fragmentary perspective view of a movie projector on which the correcting device of this invention is mounted with the projected light beam and the screen on which the color picture is projected both indicated schematically in broken and dotted lines.

FIG. 2 is a front elevational view of the filter device of this invention indicating one position of the light transparent filters in solid lines and another position in broken lines.

FIG. 3 is a view similar to FIG. 2 but taken from the rear of FIG. 2.

FIG. 4 is an enlarged vertical sectional view taken substantially along line 4—4 of FIG. 2.

DESCRIPTION OF THE PREFERRED EMBODIMENT

In the embodiment shown in the accompanying drawings the filter device 10 is shown mounted on the outer end of a lens barrel 11 of a motion picture projector 12 that is provided with the usual film reel illustrated at 13 and a leveling screw 14. As can be seen in FIGS. 2-4, the filter device 10 comprises a plastic frame 15 provided with three radial clamping screws 16 for releasably attaching the device to the barrel 11 of the lens 17.

The filter device comprises a plurality of light transparent filters, here shown as two filters 18 and 19 each of a color that is complementary to the dominant color of the light beam 20 that is projected onto a screen shown schematically at 21. Thus in the embodiment where the film is deficient in that the light beam 20 is predominantly red, the complementary color to produce a neutral beam 20, except of course for the color imparted to it by the color film (not shown), in the motion picture projector 12 is blue-green. This means that each of the filters 18 and 19 which is a flat transparent sheet is colored blue-green.

Means are provided for mounting the filters in superimposed relationship for arcuate movement 22 and 23 relative to each other and to the projector lens 17 about an axis 24 that is adjacent to but outside of the light beam 20. In the illustrated embodiment this mounting is provided by a screw 25 that extends through both of the filter sheets 18 and 19 and is held in the plastic frame 15 by engaging similarly shaped screw threads in a corresponding opening at one side 26 of the frame. In order that the filters 18 and 19 will be retained in their adjusted position there is provided a spring washer 27 between them and around the mounting screw 25.

As shown in FIG. 2 the filter sheet 18 has longitudinal side edges 28 and 29 that are arranged at an angle to each other so that the filter 18 is essentially wedge-shaped with the apex 30 of the angle of the sides 28 and 29 extending outwardly beyond the axis 24 of rotation. The other filter sheet 19 is similarly bounded by angularly arranged edges 31 and 32 with this angle also having an apex 33 beyond the axis 24 of rotational adjustment.

The one filter 18 is narrower from edge-to-edge than the second filter 19 with the filter 18 having its width insufficient to span the full width of the frame but the filter 19 being wide enough to span the full width. This adjustment is desirable in order to give the infinite range of adjustment of filtering intensity.

In the illustrated embodiment the apex 30 of the first filter 18 provides a readily accessible handle for arcuately positioning the filter. The second and wider filter 19 is provided with an edge projection 34 on the edge opposite the mounting screw 24, similarly for manipulating the position of this filter.

The filter sheets 18 and 19 are movable about the mounting screw 25 to overlap to any desired degree and to expose any desired amount of the lens 17 merely by adjusting the angle formed by the adjacent filter edges 29 and 31. This can be either to the complete light beam intercepting position illustrated by the broken lines of the edges 29 and 31 in FIG. 2 or to the open wide position to clear the light beam 20 completely so that no filter is provided. As intermediate position is illustrated in FIG. 3 where the light beam from the lens 17 passes through the edges of the filters 18 and 19 but with the central area 35 of the lens and thus the projected light beam 20 being open. When the light strikes the screen 21, however, the projected light and thus the projected image from all areas of the lens 17 mix together so that the overall color correction will be uniform and the color deficiency will be corrected by the complementary color provided by the associated filters.

In the illustrated embodiment the projecting edge portion 34 on the filter sheet 19 can be used to manipulate both filters as a unit around the axis 24 without changing their preset position relative to each other. Thus the two filters 18 and 19 can be moved arcuately 22 and 23 relative to each other to achieve the preset position which can vary between complete overlapping for maximum filtering to wide open for no filtering at all, as has been previously described, and then the filters will be held in this preset position by the action primarily of the spring washer 27 so that the two filters can thusly be maneuvered as a unit.

Having described my invention as related to the embodiment set out herein, it is my intention that the invention be not limited by any of the details of description, unless otherwise specified, but rather be construed broadly within its spirit and scope as set out in the appended claims.

I claim:

1. A filter device for correcting color deficiencies in a light beam projected from a color picture projector lens in which the light beam is noticeably dominant in a color, comprising: a pair of light transparent color filters, each of the color complementary to said dominant color; means for mounting said filters in superimposed relationship for arcuate movement about a pivot axis individually relative to each other and to said projector lens; means for moving each of said filters through intermediate positions between fully open light beam non-intercepting position and maximum closed light beam intercepting position thereby varying both the amount of overlap and thus the degree of filtering and the area of light beam intercept; and a spring member frictionally engaging said pair of filters selectively retaining each said filter in any said intermediate position as well as said fully open and said fully closed positions, each said filter having opposed straight edges on one side of the center of said light beam in fully open position and on opposite sides of the center of said light beam in maximum closed position.

* * * * *